United States Patent
Chrappan Soldavini

(10) Patent No.: US 6,362,592 B1
(45) Date of Patent: Mar. 26, 2002

(54) METHOD AND DEVICE FOR DRIVING BRUSHLESS MOTORS EITHER WITH INDEPENDENTLY COUPLED WINDINGS OR WITH STAR OR POLYGON PRE-CONNECTED WINDINGS USING THE SAME I.C.

(75) Inventor: Francesco Chrappan Soldavini, San Donato Milanese (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 0 days.

(21) Appl. No.: 09/576,693

(22) Filed: May 23, 2000

(30) Foreign Application Priority Data

May 27, 1999 (IT) .......................... VA99A0012

(51) Int. Cl.[7] .................................. H02P 1/32
(52) U.S. Cl. ........................... 318/771; 318/768
(58) Field of Search ................. 318/767, 768, 318/771, 773

(56) References Cited

U.S. PATENT DOCUMENTS 4,451,751 A * 5/1984 Auinger ..................... 318/773
6,058,032 A * 5/2000 Yamanaka et al. .......... 318/768
6,169,383 B1 * 1/2001 Johnson ..................... 318/771
6,255,797 B1 * 7/2001 Nakamura et al. .......... 318/771

* cited by examiner

Primary Examiner—Marlon T. Fletcher
(74) Attorney, Agent, or Firm—Lisa K. Jorgenson; Allen, Dyer, Doppelt, Milbrath & Gilchrist, P.C.

(57) ABSTRACT

A method is provided for driving a brushless motor of a type including windings pre-connected in a star or polygon configuration with an integrated driving system designed for independently driving the phase windings. The integrated driving system includes a plurality of output pins corresponding to the output nodes of as many half-bridge stages that are driven in pairs respectively by a direct or inverted driving signal at the same power level without overloading the output metal lines of the integrated device. Each supply terminal of the brushless motor is connected to one of the plurality of output pins of the integrated system relative to a first driving phase signal and to another output pin relative to a different driving phase signal. The drive circuit is internally configured through a plurality of integrated signal path selectors set in one or the other position depending upon the intended use of the integrated device. Further, the paths of the driving phase signals directed toward the inputs of the plurality of half-bridges driven in pairs are coherently crossed to the external connecting scheme of the windings of the motor.

14 Claims, 3 Drawing Sheets

METHOD AND DEVICE FOR DRIVING BRUSHLESS MOTORS EITHER WITH INDEPENDENTLY COUPLED WINDINGS OR WITH STAR OR POLYGON PRE-CONNECTED WINDINGS USING THE SAME I.C.

FIELD OF THE INVENTION

The present invention relates to electric circuits, and, more particularly, to a circuit device for driving a brushless electric motor and related method.

BACKGROUND OF THE INVENTION

An important parameter in driving brushless motors for hard disk drives (HDD), or other applications of similar requirements, is the ratio between the speed and the torque. One approach to optimizing this ratio includes driving the windings of a motor independently from one another through as many full-bridges. In this way, it is possible to apply the full supply voltage to each winding. The windings can therefore be designed to obtain a greater torque and/or rotating speed compared to a traditional motor using phase windings pre-connected in a star or polygon configuration.

In a three-phase motor (i.e., having three windings), to realize a "six wire" driving scheme the integrated driver device should have six pins to be connected to the respective terminals of the three windings, as shown in FIG. 1. In the case of "sinusoidal" driving, the driving system will generate three sinusoids, each 120 degrees out of phase from the others. The relative inverted and direct signals are produced on the six outputs or pins of the integrated device. The current will attain its peak value (Imax) in a phase winding, while the current in the other two phase windings is half the peak value (Imax/2), as shown in FIG. 2.

Should the same integrated driver device be used for driving a traditional motor with phase windings pre-connected in a star or polygon configuration (a triangle in the case of a three-phase motor), such as a three-phase motor in a star configuration (three wires), only three of the six output pins will be connected to the motor (for the considered example A1, B1 and C1), as shown in FIG. 3. In this case the available limit peak current would be the same, thus the power supplied to the motor will be halved because the maximum voltage applied on each winding is halved.

For delivering the same electric power using the same integrated device, the outputs may be connected in parallel to feed the motor with a doubled peak current Imax. This may be done by connecting A1 and A2 to the phase A winding of the motor, B1 and B2 to the phase B winding, and C1 and C2 to the phase C winding, and configuring the driving circuit to phase the A2, B2 and C2 outputs depending on the value of a register of the integrated driving system. This scheme is shown in FIG. 4. Such a configuration is relatively easy to implement.

FIG. 5 shows a typical partial layout of the output half-bridges. The figure also highlights the twelve MOS transistors that make up the three full-bridges, the supply and ground pads, and the relative pins for the connection to the three-phase motor to be driven with independently fed windings. The metal lines that connect the various ground and supply pads to the relative current terminals of the power transistors are normally designed for the expected maximum peak value envisioned for driving a six wire three-phase motor.

The above adaptation for driving a traditional three-phase motor may cause an overload of the metal lines of the integrated circuit; that is, of the output stages toward the respective pins. The doubling of the currents supplied to the motor may cause electro-migration phenomena in the metalizations of the integrated circuit.

As a consequence, an integrated device designed for an independent driving of each winding would normally be unusable for driving an equivalent motor in a star or polygonal configuration at the same power level. This is because of the circuitry-induced doubling of the peak current in the metal supply and ground lines. On the other hand, it would not be cost effective to design an integrated circuit with metal lines of deliberately augmented widths simply because the same integrated circuit may be needed to implement the above adaptation.

SUMMARY OF THE INVENTION

It is therefore an object of the present invention to provide a method and a circuit arrangement which allows the driving of a conventional brushless motor having its phase windings pre-connected in a star or polygon configuration by an integrated driving system designed for separately driving each winding of a multi-phase brushless motor. The metal supply and ground lines are correctly sized for separately driving the windings at the same power level without overloading the metal lines toward the supply and ground output pins.

This significant result is obtained by connecting each terminal of the brushless motor having its phase windings pre-connected in a star or polygon configuration to an output pin of the integrated driving system relative to a first phase driving signal and to another output pin relative to a different phase driving signal. An internal configuring means or circuit is provided including a plurality of integrated path deviators or selectors that may be set in one or another position depending on the actual mode of use of the integrated device. The paths of the direct signals to the plurality of output pins are coherently crossed from the external connecting scheme of each terminal of the motor to the output pins of the integrated device. In this way, overloading on the output metal tracks is effectively avoided when a star or polygon configured motor is driven at the same power as in a phase independent driving mode of the windings through respective full-bridges.

BRIEF DESCRIPTION OF THE DRAWINGS

The different aspects and advantages of the invention will become even more evident through the following description of an embodiment and upon referring to the attached drawings.

DETAILED DESCRIPTION OF THE PREFERRED EMBODIMENTS

Figure 1:
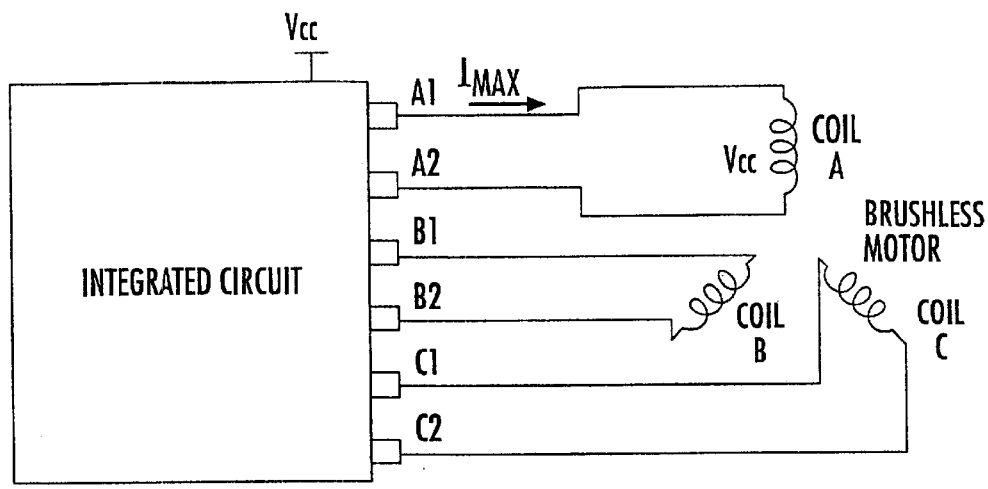
FIGS. 1 through 5 illustrate the different connection options and the relative technical problems of the prior art, as discussed above, for an integrated driving system of a three-phase brushless motor.
Figure 2:
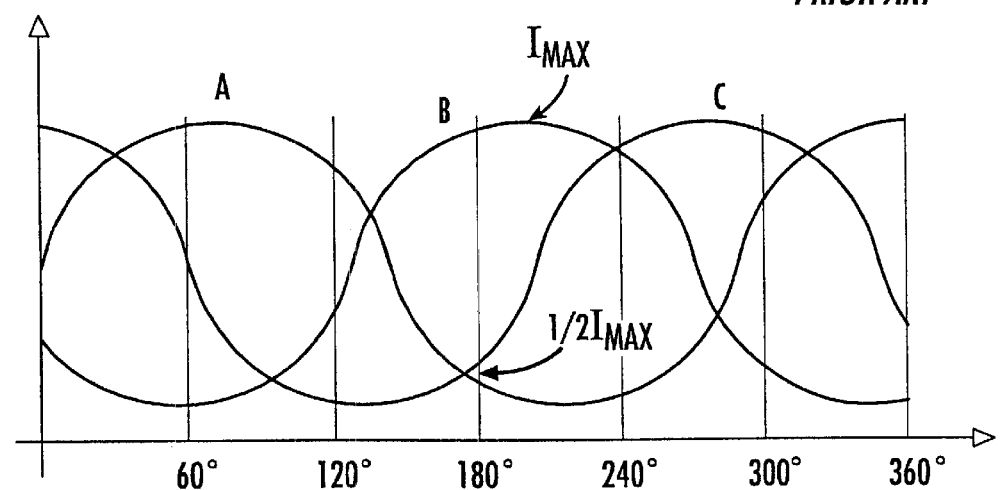
Figure 3:
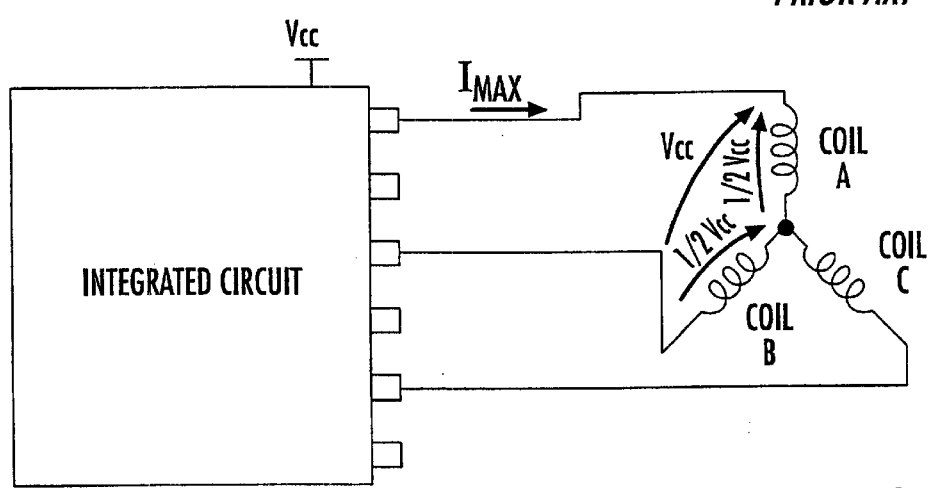
Figure 4:
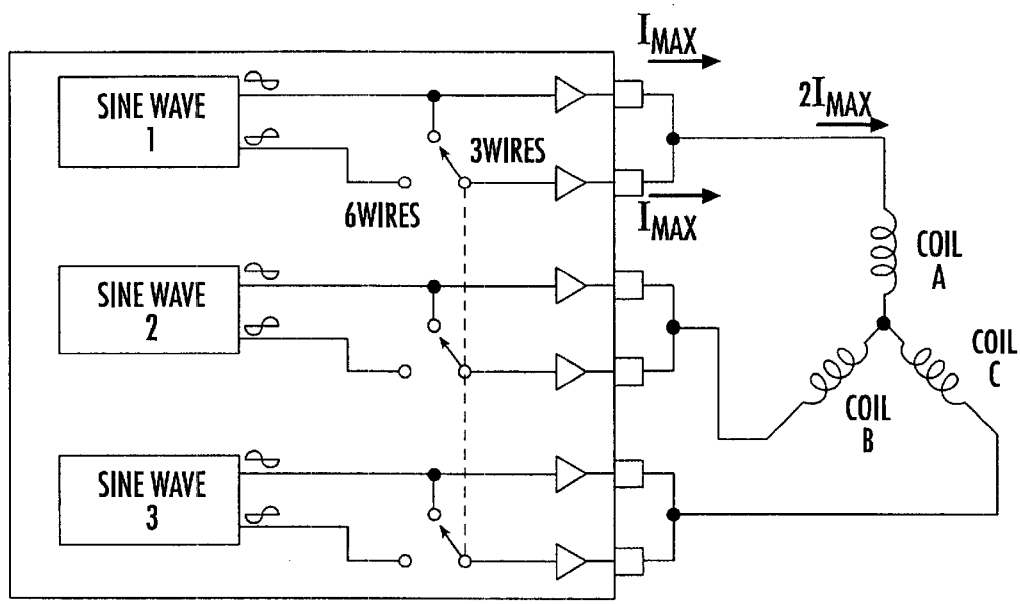
Figure 6:
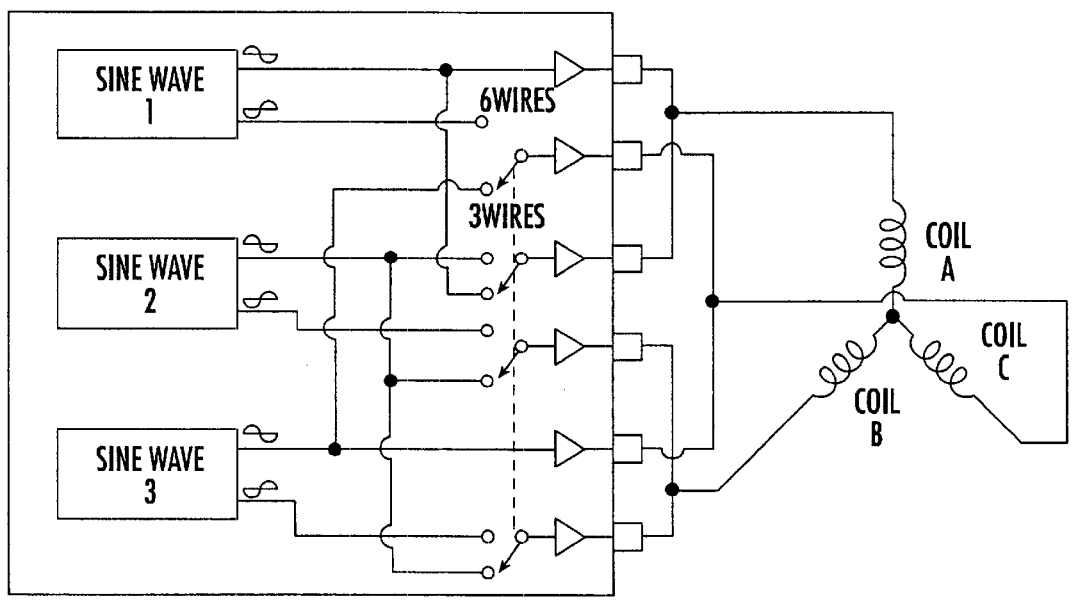
FIG. 6 shows a connecting scheme according to the present invention.
Figure 5:
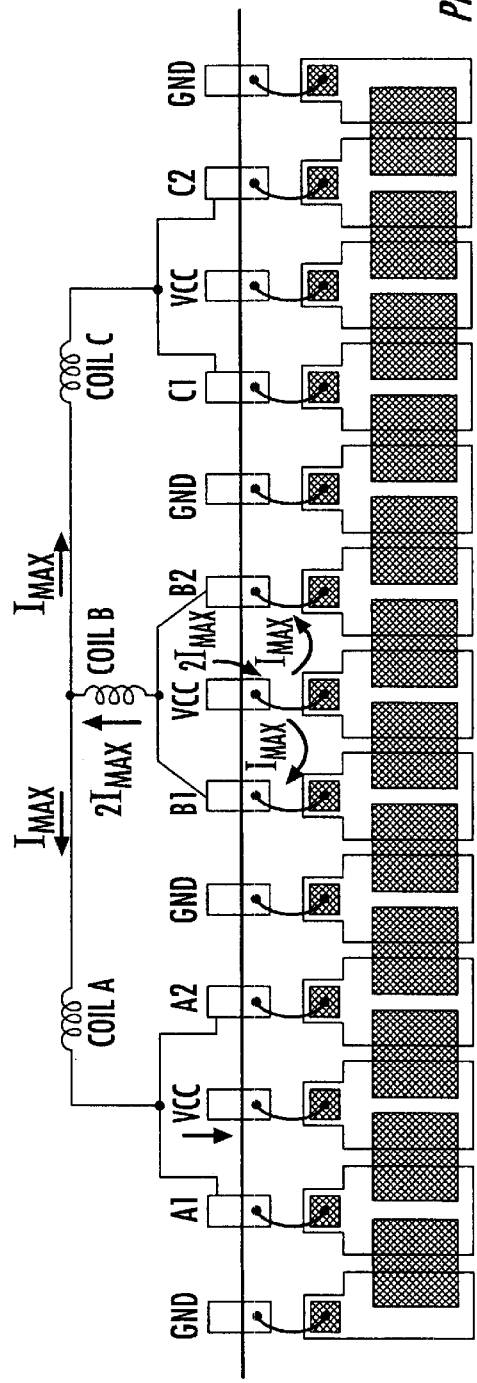

FIGS. 4 and 6 are directed to the case of a three-phase motor connected in a star configuration, although they are also applicable to the case of six (or more) phase motors in a star or polygon configuration. If the outputs A1-A2, B1-B2, and C1-C2 are connected in common, according to the scheme of FIG. 4, while coherently modifying the switching phases in order to deliver to the load a double current, a resulting double peak current in the metal lines toward the output pins would be possible, as highlighted in the partial layout of FIG. 5.

The connecting scheme of the invention is shown in the example of FIG. 6 for a three-phase motor connected in a star configuration. The terminal A of the motor is connected to the outputs A1 and B1, the B terminal of the motor is connected to the outputs B2 and C2, and the C terminal of the motor is connected to the outputs A2 and C1, thus providing the indicated crossing of the lines of the relative phase signals. In this manner the problem of doubling the peak current in the metal lines is mitigated.

Figure 7:
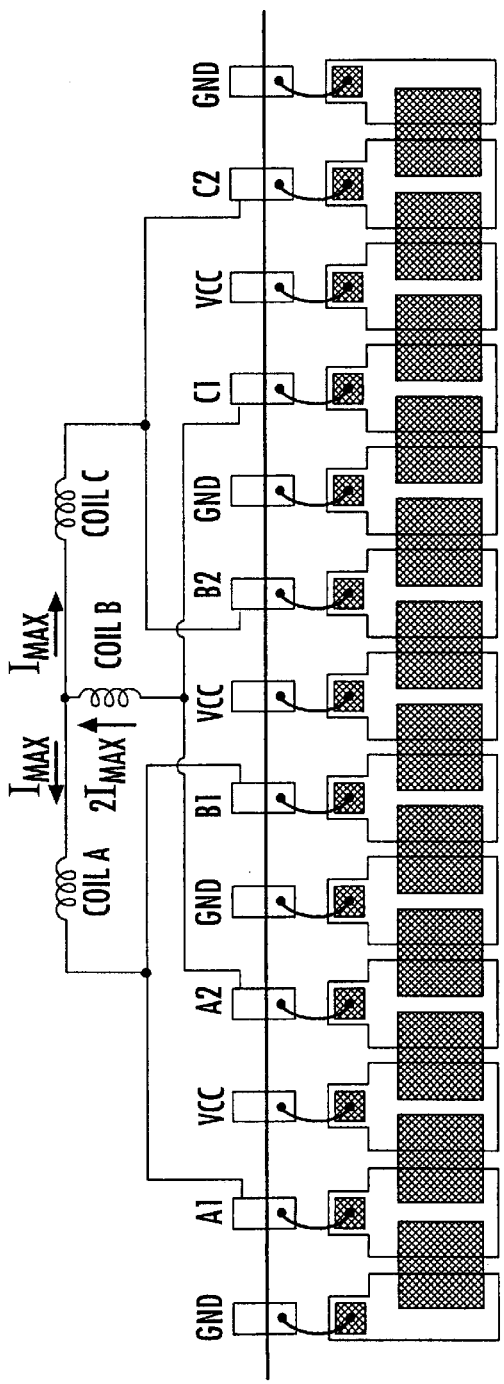
FIG. 7 shows a connecting scheme according to the present invention illustrating a partial layout of the output half-bridges of the integrated device.

This result is highlighted in the partial layout of FIG. 7 and may be easily compared with the scheme discussed above with reference to FIG. 5.

That which is claimed is:

1. A method of driving a first brushless motor comprising a plurality of first phase windings each having first and second terminals wherein the second terminals are pre-connected to form a star or polygon configuration with an integrated driving system also for driving a second brushless motor comprising a plurality of second phase windings adapted to be independently driven by respective output full-bridges, the integrated driving system comprising at least one signal generator for generating a plurality of driving phase signals, a plurality of output full-bridges each comprising a pair of half-bridge stages wherein each of the half-bridge stages has an input and an output and is driven at its input by one of the plurality of driving phase signals, and a plurality of output pins each connected to a respective output, the method comprising:

connecting each of the first terminals to one of the plurality of output pins relative to one of the plurality of driving phase signals and to another output pin relative to a different one of the plurality of driving phase signals;

providing a plurality of signal path selectors at the inputs; and driving the plurality of signal path selectors to a predetermined position corresponding to the phase winding configuration of the first motor by crossing the paths of at least one of the plurality of driving phase signals directed toward the inputs.

2. The method of claim 1 wherein the plurality of first phase windings comprises three phase windings and the plurality of output full-bridges comprises three output full-bridges.

3. The method of claim 1 wherein the plurality of driving phase signals comprises sinusoidal signals.

4. A method of driving a first brushless motor comprising a plurality of phase windings each having first and second terminals wherein the second terminals are pre-connected to form a star or polygon configuration with an integrated driving system also for driving a second brushless motor comprising a plurality of phase windings adapted to be independently driven by respective output full-bridges, the method comprising:

generating a plurality of driving phase signals;

providing a plurality of half-bridge stages each having an input and an output;

connecting each of the inputs to one of the plurality of driving phase signals;

connecting each of the first terminals to one of the plurality of output pins relative to one of the plurality of driving phase signals and to another output pin relative to a different one of the plurality of driving phase signals;

providing a plurality of signal path selectors at the inputs; and driving the plurality of signal path selectors to a predetermined position corresponding to the phase winding configuration of the first motor by crossing the paths of at least one of the plurality of driving phase signals directed toward the inputs.

5. The method of claim 4 wherein the plurality of first phase windings comprises three phase windings and the plurality of output full-bridges comprises three output full-bridges.

6. The method of claim 4 wherein the plurality of driving phase signals comprises sinusoidal signals.

7. An integrated driving system for a brushless motor comprising a plurality of phase windings each having a pair of terminals, the integrated driving system comprising:

at least one signal generator for generating a plurality of inverted driving phase signals and a plurality of direct driving phase signals;

a plurality of output full-bridges, each of said plurality of output full-bridges comprising a pair of half-bridge stages each having a respective input and an output and wherein the first input of each pair is connected to one of the plurality of direct driving phase signals and the second input of each pair is connected to one of the plurality of inverted driving phase signals;

a plurality of output pins each corresponding to a respective output and connected to a terminal;

a plurality of output lines connecting each of said plurality of output pins to its respective output;

a plurality of signal path selectors connected to the inputs of said half-bridge stages; and a configuring circuit for configuring said plurality of signal path selectors for driving a first brushless motor comprising a plurality of first phase windings driven independently from each other through respective output full-bridges or for driving a second brushless motor comprising a plurality of second phase windings pre-connected in a star or polygon configuration at the same power without doubling the peak current delivered through at least one of said plurality of output lines.

8. The integrated driving system of claim 7 wherein each of said plurality of output lines comprises metal.

9. The integrated driving system of claim 7 wherein said plurality of output full-bridges comprises three output full-bridges.

10. The integrated driving system of claim 7 wherein the plurality of direct driving phase signals and the plurality of inverted driving phase signals comprise sinusoidal signals.

11. An integrated driving system for a brushless motor comprising a plurality of phase windings each having a pair of terminals, the integrated driving system comprising:

a plurality of output full-bridges, each of said plurality of output full-bridges comprising a pair of half-bridge stages each having a respective input and an output;

a plurality of output pins each corresponding to a respective output and connected to a terminal;

a plurality of output lines connecting each of said plurality of output pins to its respective output;

a plurality of signal path selectors connected to the inputs of said half-bridge stages; and a configuring circuit for configuring said plurality of signal path selectors for driving a first brushless motor comprising a plurality of first phase windings driven independently from each other through respective output full-bridges or for driving a second brushless motor comprising a plurality of second phase windings pre-connected in a star or polygon configuration at the same power without doubling the peak current delivered through at least one of said plurality of output lines.

12. The integrated driving system of claim 11 wherein said plurality of output full-bridges comprises three output full-bridges.

13. The integrated driving system of claim 11 further comprising at least one signal generator for generating a plurality of inverted driving phase signals and a plurality of direct driving phase signals; and wherein the first input of each pair of half-bridge stages is connected to one of the plurality of direct driving phase signals and the second input of each pair of half-bridge stages is connected to one of the plurality of inverted driving phase signals.

14. The integrated driving system of claim 11 wherein each of said plurality of output lines comprises metal.

* * * * *